(12) United States Patent
Haddad (10) Patent No.: US 7,973,979 B2
(45) Date of Patent: Jul. 5, 2011

(54) METHODS AND SYSTEMS FOR CENTRALIZING AN APPLICATION PROCESS

(75) Inventor: George Haddad, Newton, MA (US)

(73) Assignee: Liaison International, Inc., Watertown, MA (US)

( * ) Notice: Subject to any disclaimer, the term of this patent is extended or adjusted under 35 U.S.C. 154(b) by 1017 days.

(21) Appl. No.: 11/804,213

(22) Filed: May 16, 2007

(65) Prior Publication Data

US 2008/0288964 A1    Nov. 20, 2008

(51) Int. Cl.
H04N 1/04    (2006.01)

(52) U.S. Cl. ......... 358/403; 358/405; 358/474; 358/296

(58) Field of Classification Search .................. 358/403, 358/405, 474, 296, 497
See application file for complete search history.

(56) References Cited

U.S. PATENT DOCUMENTS

| | | | |
|---|---|---|---|
| 6,345,278 B1 | 2/2002 | Hitchcock et al. | |
| 6,460,042 B1 | 10/2002 | Hitchcock et al. | |
| 7,720,616 B2 * | 5/2010 | Wyle et al. | 702/31 |
| 2008/0126105 A1 * | 5/2008 | Castineiras | 705/1 |
| 2008/0288964 A1 * | 11/2008 | Haddad | 719/320 |

* cited by examiner

Primary Examiner — Houshang Safaipour
(74) Attorney, Agent, or Firm — Finnegan, Henderson, Farabow, Garrett & Dunner, LLP (57) ABSTRACT

Provided are methods and systems for centralizing an application process.

20 Claims, 1 Drawing Sheet

FIG. 1

METHODS AND SYSTEMS FOR CENTRALIZING AN APPLICATION PROCESS

BACKGROUND OF THE INVENTION

Centralized Application Service (CAS) systems have rapidly become the solution of choice for many schools, particularly those in the U.S. health professional associations over the past few years. The primary goal of such services is to facilitate the admissions process for applicants, schools and programs, and the advisors. For highly competitive and specialized fields in which applicants tend to apply to many schools—often outside of their local area—a CAS system provides a variety of significant benefits.

For the school or professional association, applicant demographic data may be obtained and used as a tool to assist the association in applying for grants; support the lobbying efforts for federal grants programs, NIH, financial assistance relief, etc. The CAS systems also aids the school or association in developing workforce projections, future trends, and recruitment strategies based on accurate set of data and affords it the ability to assess and compare statistical data on applicants. The CAS can be a source of substantial non-dues revenues for the association.

To applicants, a CAS system affords major savings in terms of time and money. In addition, the incremental cost of adding an additional school is far less than applying directly to a different school. A CAS system allows an applicant to streamline the efforts needed to send the credentials documents to multiple schools. A CAS requires one application, one set of transcripts and one set of letters of recommendations, and test scores, irrelevant to the number of schools designated by the applicants. It allows applicants to research and compare the different programs in a systematic and comprehensive way.

Current methods for processing CAS applications involve processing tens of thousands of applications through a manual and labor intensive process. The existing processes require the manual validation, verification, and matching the official documents to the individual applicant. Thus, documents are routinely misplaced, hard to find, or damaged during the manual processing and filing. Further, current processes incur human error in logging the receipt of the documents, the creation and filing of such paper documents, the processing of the applications during printing, compilation and dissemination of the applications to the designated schools. Such errors have caused unnecessary delays and reduced productivity.

SUMMARY OF THE INVENTION

The present invention provides methods, systems and apparatus, including computer programs, for centralizing an application process.

In one aspect, the invention features methods that include acts of receiving at least one application supporting document associated with a second document comprising a unique identifier correlating the at least one application supporting document with an applicant; scanning the at least one application supporting document into an applicant file based on the unique identifier; receiving application information in a centralized application form and format from the applicant; and verifying the received application information against information contained in at least one scanned supporting application document by viewing the application information and scanned application document simultaneously and consolidating the received application supporting documents and application information correlated with an applicant into an application.

The methods increase efficiency in processing applications, reduce human intervention and errors in the processing, allow tracking of the application components via the unique identifier, and eliminate the collating work needed to join all the diverse documents of one application by merging all these documents using the tracking. Importantly, the scanning coupled with the use of the unique identifier allows one time handling of incoming application supporting documents by staff and automated indexing and storage. Further, the simultaneous viewing and verification of received application information against information contained in at least one scanned supporting application document increases the speed and accuracy of the verification.

These embodiments of the present invention, other embodiments, and their features and characteristics will be apparent from the description, drawings, and claims that follow.

BRIEF DESCRIPTION OF THE DRAWINGS

The following detailed description will be better understood by reference to the drawings, in which.

DETAILED DESCRIPTION

Definitions

For convenience, before further description of the invention, certain terms employed in the specification, examples, and appended claims are collected here. Unless defined otherwise, all technical and scientific terms used herein have the same meaning as commonly understood by one of ordinary skill in the art to which this invention belongs.

The articles "a" and "an" are used herein to refer to one or to more than one (i.e., to at least one) of the grammatical object of the article.

The term "application supporting document" as used herein refers to any document used to support an application for admission to a school, for example, a transcript, a letter of recommendation, a curriculum vitae, etc.

The term "application information" refers to the information provided in an application, such as applicant name, date of birth, schools attended, coursework performed, etc.

The term "information in a centralized application form and format" refers to information provided in an application form that is of a format approved by an organization and that is used for all the organization's applications.

The terms "including", "comprising" and variations thereof mean "including but not limited to", unless expressly specified otherwise.

The term "process" means any process, algorithm, method or the like, unless expressly specified otherwise, and such terms are used interchangeably herein. Each process (whether called a method, algorithm or otherwise) inherently includes one or more acts.

Methods of Centralizing an Application Process

Provided are methods and systems for centralizing an application process.

In one embodiment, a method for centralizing an application process may comprise the acts of: (a) receiving at least one application supporting document associated with a second document comprising a unique identifier correlating the at least one application supporting document with an applicant; (b) scanning the at least one application supporting document into an applicant file based on the unique identifier; (c) receiving application information in a centralized application form and format from the applicant; (d) verifying the received application information against information contained in at least one scanned supporting application document by viewing the application information and scanned application document simultaneously; and (e) consolidating the received application supporting documents and application information correlated with an applicant into an application.

The application supporting document may be, for example, an official transcript, a letter of reference, a curriculum vitae, an article or publication, etc.

The second document comprising a unique identifier may be a document used to obtain the application supporting document, for example, a transcript request or letter of reference request. In other embodiments, it may simply be a paper comprising the unique identifier that is attached to or associated with the application supporting document.

The unique identifier may be any means of labeling the second document such that it is able to be identified with reasonable confidence as belonging only to the applicant with which it is correlated. In certain embodiments, the unique identifier is a bar code. The bar code may encode such information as: document identity, applicant identity, application service, and application year.

Scanning may be accomplished using any method and apparatus known to one of skill in the art for creating an electronic image of a document. Scanned documents may be stored in a database or other computer-readable medium.

Once a scanned document is stored and indexed based on the unique identifier, a proprietary software program may perform the following at time intervals, e.g. every 1 minute: (1) the software program checks the validity of the unique identifier and determines if it can be processed. If an alert is triggered due to the inconsistency of the unique identifier, the software writes a message to the database indicating the type of error that occurred and (2) if the unique identifier is correct, the software moves the scanned document to the designated directory of the data storage server, and flags the document record on the applicant folder to be received and records that date it has been received.

The applicant file is an electronic file, e.g., stored in a database or other computer-readable medium, comprising the scans of the application supporting documents and application information.

The act of verifying the received application information against information contained in at least one scanned supporting application document by viewing the application information and scanned application document simultaneously may be performed by any suitable means for viewing information simultaneously. In certain embodiments, this is accomplished by displaying the information in two separate displays, e.g., monitors.

The act of consolidating is preferably performed electronically, e.g., by accessing the received application supporting documents and verified application information correlated with an applicant from the applicant file, e.g., stored on a database or computer-readable medium, and creating an application from it.

Once consolidated and created, the application may be printed and auto-collated. Paper and/or electronic versions of the application may be sent to a recipient, e.g., an admissions officer. The above methods may further comprise displaying at least one scanned application supporting document, and the verified application information to the recipient, e.g., separately from sending them a printed or electronic copy of the application, for example by displaying it on a monitor directly or via a web browser.

The supporting application documents may be archived based on the unique identifiers.

In other embodiments, a method for centralizing an application process may comprise the acts of: (a) receiving at least one official transcript associated with a transcript request comprising a unique identifier correlating the at least one official transcript with an applicant; (b) receiving at least one letter of recommendation associated with a letter of recommendation request comprising a unique identifier correlating the at least one letter of recommendation with an applicant; (c) scanning the at least one official transcript and letter of recommendation into an applicant file based on the unique identifiers; (d) receiving coursework information from the applicant; (e) verifying the received coursework information against the at least one scanned official transcript by viewing the coursework information and scanned official transcript simultaneously; and (f) consolidating the at least one official transcript, letter of recommendation and verified coursework information correlated with an applicant into a centralized application.

The method may comprise additional steps, such as, for example, archiving the at least one official transcript and letter of recommendation based on their unique identifiers, sending the centralized application to a recipient, printing and auto-collating the centralized application, e.g., in paper and/or electronic formats, and displaying at least one scanned application supporting document, and the verified application information to the recipient(s), e.g., on a monitor.

The act of verifying may further comprise verifying the received coursework information against information contained in at least one scanned official transcript by viewing the coursework information and scanned official transcript simultaneously on two separate displays, e.g., monitors.

Methods for implementing the above-described processes are also provided. For example, such methods may be implemented from a server.

In one embodiment, a method for implementing a centralized application process, comprises the acts of: (a) receiving applicant information in a centralized application form and format; (b) receiving at least one scanned application document associated with the applicant via a unique identifier; (c) transmitting each of the applicant information and the at least one scanned application document to a separate display; (d) receiving information relating to the accuracy of the applicant information; (e) consolidating the applicant information and at least one scanned application document into an application file; and (f) transmitting the application file.

Although method steps, process steps, algorithms or the like may be described in a particular sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described singly or without reference to other products or methods, in an embodiment the process may interact with other products or methods. For example, such interaction may include linking one application process to another application process. Such interaction may be provided to enhance the flexibility or desirability of the process.

Systems for Implementation of the Methods of Centralizing an Application Process The methods of centralizing an application process described above are preferably implemented as a browser-based system in which at least program running on a user's computer (the user's web browser) requests information from a server program running on a system server. The system server sends the requested data back to the browser program and the browser program then interprets and displays the data on the user's computer screen. The process is as follows:

1. The user runs a web browser program on his/her computer.
2. The user connects to the server computer (e.g., via the Internet). Connection to the server computer may be conditioned upon the correct entry of a password as is well known.
3. The user requests a page from the server computer. The user's browser sends a message to the server computer that includes the following: the transfer protocol (e.g., http://); and the address, or Uniform Resource Locator (URL).
4. The server computer receives the user's request and retrieves the requested page, which is composed, for example, in HTML (Hypertext Markup Language).
5. The server then transmits the requested page to the user's computer.
6. The user's browser program receives the HTML text and displays its interpretation of the requested page.

Thus, the browser program on the user's computer sends requests and receives the data needed to display the HTML page on the user's computer screen. This includes the HTML file itself plus any graphic, sound and/or video files mentioned in it. Once the data is retrieved, the browser formats the data and displays the data on the user's computer screen. Helper applications, plug-ins, and enhancements such as Java™ enable the browser, among other things, to play sound and/or display video inserted in the HTML file. The fonts installed on the user's computer and the display preferences in the browser used by the user determine how the text is formatted.

If the user has requested an action that requires running a program (e.g., a search), the server loads and runs the program. This process usually creates a custom HTML page "on the fly" that contains the results of the program's action (e.g., the search results), and then sends those results back to the browser.

In certain embodiments, there may be a plurality of users each using a different program to implement a portion of the process. For example, in certain embodiments, as described further in Example 2, separate programs implementing an Applicant Portal, a Management Portal, an Admissions Portal, an Advisor Portal, and an Electronic Letter of Reference (ELOR) Portal may be used.

Browser programs suitable for use in connection with the system of the present invention include Netscape®. Navigator available from Netscape® Communications Corporation and Internet Explorer available from Microsoft® Corp.

While the above description contemplates that each user has a computer running a web browser, it will be appreciated that more than one user could use a particular computer terminal or that a "kiosk" at a central location (e.g., an office, computer cluster, dorm, etc.) with access to the system server could be provided.

It will be recognized by those in the art that various tools are readily available to create web pages for accessing data stored on a server and that such tools may be used to develop and implement the central application processing system described below and illustrated in the accompanying FIG. 1.

It will be readily apparent to one of ordinary skill in the art that the various methods/processes described herein may be implemented by, e.g., appropriately programmed general purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, i.e. databases of content, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

EXEMPLIFICATION

The invention, having been generally described, may be more readily understood by reference to the following examples, which are included merely for purposes of illustration of certain aspects and embodiments of the present invention, and are not intended to limit the invention in any way. All headings are for the convenience of the reader and should not be used to limit the meaning of the text that follows the heading, unless so specified.

Example 1

Exemplary CAS Process Implementation

Figure 1:
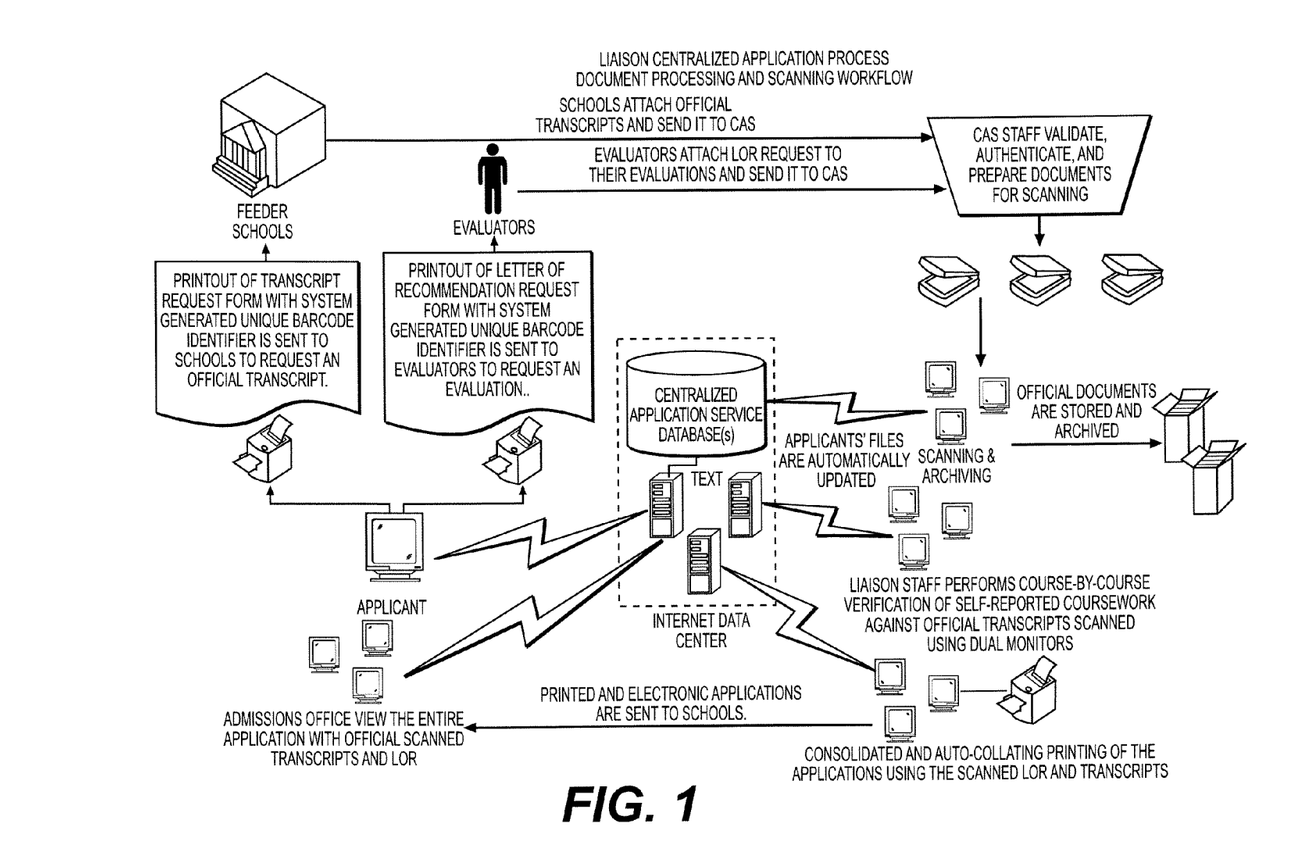
FIG. 1 depicts a workflow diagram illustrating an embodiment of the methods for centralizing an application process described herein.

FIG. 1 summarizes in a diagrammatic format the process described below.

A dedicated association, council, group, or end user institution CAS P.O. Box may be established for all incoming transcript mail. Applicants may request official transcripts to be sent to the P.O. Box which will come directly to association, council, group, or end user institution dedicated processing facility.

All institutional transcripts sent to the P.O. Box may be collected on a daily basis, processed and examined for authenticity and validity. After each piece has been sorted and filed, the documents may be prepared for scanning.

A document processor ensures the cover letter is attached to the official document. The applicant may print out the cover letter and send the completed document with a bar code to request the official or unofficial document (transcript, letter of recommendation, other). If the cover letter is missing or is not legible for the scanning process, the document processor will print a new cover letter for the applicant to attach to the official document.

If it is determined that there is an issue with a transcript, the applicant may be notified of the issue and the matter recorded on his/her application.

The cover letters and official or unofficial document are separated and ready for scanning by association, council, group, or end user institution Each applicant's transcript(s) (and cover letter) may be scanned into the system and assigned to an individual applicant using a unique identifier, e.g., a bar code, as well as given a date stamp. This unique identifier is matched to each individual applicant in the system, thereby eliminating any human intervention or input.

Instructions may be provided to foreign applicants detailing how to submit their foreign transcripts to association, council, group, or end user institution CAS. Foreign transcripts and evaluated transcripts from the various evaluation services, e.g. World Education Service ("WES"), may be accepted.

Once the individual transcript(s) are scanned into the system, the documents are verified. Using a dual screen process to see self reported information and the official document, each individual item such as course and grade is checked and the official transcript is verified against self-reported courses and grades submitted by the applicants. The process may include mapping official transcript grade translations on each transcript against the applicant's self reported grades.

During the transcripts verification, the applicant's officially verified and scanned grades are converted based on a pre-defined set of grading standards. (Table I below) The staff verifies each course title, course subject, course number and prefix, and the classification that every course belongs to (Science, Non-Science, etc.) Below is an example of the conversion table used by some health professions associations.

TABLE I

Acceptable Grades - With the exemption of the grade "NONE", all the below grades are valid for GPA calculation.

| Grade on Transcript (No alpha grade key on transcript) | "CAS Grade" and Value |
|---|---|
| 4.00-3.80 | A (4.0) |
| 3.79-3.60 | A- (3.7) |
| 3.59-3.40 | AB (3.5) |
| 3.39-3.10 | B+ (3.3) |
| 3.09-2.80 | B (3.0) |
| 2.79-2.60 | B- (2.7) |
| 2.59-2.40 | BC (2.5) |
| 2.39-2.10 | C+ (2.3) |
| 2.09-1.80 | C (2.0) |
| 1.79-1.60 | C- (1.7) |
| 1.59-1.40 | CD (1.5) |
| 1.39-1.10 | D+ (1.3) |
| 1.09-0.80 | D (1.0) |
| 0.79-0.60 | D- (0.7) |
| 0.59-0.40 | DE (0.5) |
| Less than or equal to 0.39 | F (0.0) |
| Non-graded designations | NONE |

Course Types not counted in the GPAs: Withdrawn courses, Incomplete courses, Audited courses, Pass/Fail courses, Non-graded transcripts, Advanced Placement (AP), International Baccalaureate (IB), and CLEP courses, Planned courses, In-progress courses, Courses from foreign institutions, not including study abroad, Deferred courses Course Classifications that may be included in the GPA: Not Applicable, Repeated, Distance Learning, Honors, Study Abroad, Regent's Exam, Institutional/Departmental Exam Calculated GPAs generated by system: Lower division undergraduate, upper division undergraduate, Undergraduate cumulative, Post-bacculaureate, Graduate, Biological/Life Sciences, Math, Business, Social Sciences, General (Other).

If a problem in an official transcript during verification is identified, i.e. an official transcript is missing a course or multiple missing courses have not been self reported; the applicant may be notified and the application is put on hold until the issue is resolved. These issues may be documented and it may be ensured that all constituencies have been notified either through the portal or through written and/or verbal communication in a timely fashion. The progress of the issue is documented, managed, and tracked through the CAS portal (see Example 2) until its final resolution.

Once all the documents have been verified in the CAS system, schools may view the entire application and GPA calculations through a portal. An application is not considered to be complete and ready for printing and made available for electronic download until the all required information and documentation has been received. The process for defining COMPLETE and ready for printing is decided by the association. Information is made available to schools upon e-submission by applicants but an application is not defined as COMPLETED application nor is the GPA calculated until all required fields have been filled out and verified.

The established P.O. Box is used for all letters of recommendation (LOR) mailed by each applicant's reference.

Each LOR sent to the P.O. Box is collected, date stamped, and processed on a daily basis and checked for completeness and validity.

After each piece has been sorted, the documents are prepared for scanning by printing a cover sheet and filing each individual LOR.

Each complete LOR processed is matched to an individual applicant and then scanned into the system with the applicants' unique identifier and bar code. This process is similar to the transcript process.

Once the mailed LOR is complete and scanned into our system, it is available electronically for each individual designation the applicant selected.

A bank account may be set up with the necessary tools and services to accept Credit Cards ("CC") on-line. Association, council, group, or end user institution information may be provided to a preferred vendor that is reliable and offers acceptable rates. On behalf of the association, the collection of payments (CC, Money orders or Checks) may be managed and each applicant payment may be consolidated against deposits in the bank.

Association, council, group, or end user institution may have the rights and access to inquire about the financial status at any time during the application process.

Comprehensive mailing options may be provided for association and schools who wish to keep paper applications. A collated and formatted complete application with associated official documents may be provided.

An electronic file may be created that the schools may use to upload their applicants' information to their local administrative system.

A PDF similar to the printed version that the schools and colleges receive on paper may be made immediately available for schools and colleges to print from the CAS Portal prior to the mailing process and throughout the application cycle. This feature will allow the schools to adopt a paperless process if they so desire.

During a specified period of time (determined by the association) the system may allow applicants the ability to update their planned and in-progress coursework.

The service may process each transcript for academic update and verify the additional coursework. A new GPA for every applicant may be generated.

The applicants will be flagged as revised and the schools will have access to the data electronically with a mailing and also through the admissions portal.

When official documents are scanned into the system they may be also tagged and documented for the purposes of storage of official documents. Anytime during the application cycle and for a period of up to a year or more, the documents may be stored in individually numbered boxes and that correspond with the scanned documents. This allows the quick retrieval of the hard copy in a particular box appropriately labeled without the need to look though multiple boxes and allow the storage company to find a particular box containing a hard copy document required.

Archiving services for all paper transcripts and LOR's received at the P.O. Box throughout the entire application cycle are provided. Staff may assign each applicant to a corresponding archiving box, which is also scanned for accuracy.

The archived boxes may be sent to an off-site storage facility to preserve the original documents and, in particular, the transcripts for retrieval when and if any inquiries from applicants and schools come to the CAS Portal.

Example 2

Exemplary Web-Based System to Implement the Process of Example 1

A CAS may consist of five portals:

1. Applicant Portal: A web-based portal where applicants fill in their on-line application form and return subsequently to update specific sections (demographics, Letter of Recommendation requests, planned courses, additional designations, etc.)

2. Management Portal: A web-based portal where the overall applicant pool can be viewed and managed by whoever is responsible for the application/student portal.

3. Admissions Portal: A web-based portal that would be made available to the admissions officers/advisors at the schools and colleges participating in the CAS program.

4. Advisor Portal: A web-based portal that would be made available to registered advisors at any campus deemed to have an interest in sending qualified students to the participating schools and colleges of the association, council, group, or end user institution CAS Portal.

5. Electronic Letter of Reference (ELOR) Portal: A web-based portal where references identified by applicants can prepare and submit their electronic letters or paper letters of reference.

Each of these portals is described in greater detail below.

Applicant Portal

The Applicant Portal is a web-based public portal which is available to Applicants to complete, communicate and track their application and the corresponding documents. The Applicant Portal may be seamlessly integrated with the Admissions, Management and ELOR Portals. The following describes the proposed features and flow process in this portal.

The first time the applicant visits this portal an account is created and the applicant obtains an ID. This ID may be used to communicate with the Admissions Office and track the status of his/her application. Once the applicant is logged in, he/she is presented with a checklist of sections to be completed. Some of these sections are mandatory and some are not. The association, council, group, or end user institution will decide on such validation rules. The applicant may fill the application section in one or multiple visits, and the CAS Portal saves the applicant's information on the system for the next visit. Where applicable, the fields in each of the application section may be validated and checked for completion before the applicant is allowed to leave a particular section. All the sections may be validated for completion upon submission. The applicant may create one or many essays to send to all or individual school an college designations. The applicant portal contains a messaging center that allows the receipt of announcements, message, and notifications from the Admissions Officers regarding the status of the application or general notices. All messages are kept in an unedited chronological log to maintain history.

Using the ELOR section of the Applicant Portal, the applicant lists the names and contact information of the references that he/she would like to receive Letters of Evaluations from. The Applicant Portal will dynamically send an email to the corresponding references to allow them access to their applicants.

In the Colleges Attended section of the Applicant Portal, the applicant lists all the colleges that he/she has attended with the corresponding dates and years of attendance. This section integrates directly with the Management Portal for the receipt of the requested official transcripts.

The Course section of the Applicant Portal allows the applicant to fill after the Colleges attended. The applicant will be instructed to enter all the courses, sessions, grades and credits for all the courses that he/she has attended as listed in the transcripts. Validation rules are programmed to maintain the integrity of the coursework data entry.

The official test(s) are entered in the Applicant Portal for all the taken and planned exams, based on the availability and type of official exam. In addition to collecting self-reported and official test scores, the applicant official test data (TOEFL, MCAT, PCAT, GRE and others) received from various test agencies, e.g., ETS, AMCAS, etc., may be downloaded and made part of the official tests of the application.

Upon completion of the application, the applicant may pay using credit card or check to submit the application.

Before the final submission of the application, the system checks for the completion of the mandatory sections. In some instances, the applicant might designate a school or program that might request additional information/questions that are school-specific. In this case, the applicant may be prompted to answer these additional questions which are made part of the printed and electronic applications that are sent to a designated school. In addition, the applicant may be requested to validate that he/she is aware of the non-mandatory sections and were skipped on purpose thus avoiding any miscommunications with the applicant.

After the final submission of the application, the applicant may revisit the application to revise certain sections, e.g. demographics, additional designations, and track the receipt of the supporting documents. The applicant may also be authorized to revise and update select sections of the application during a planned Academic Update period (defined by the association).

The applicant may check on the status of his/her application to determine when of if the official documents have been received and entered into the system with a date stamp. This allows the applicant to monitor the process in real time and eliminated customer service inquiries to determine if the official documentation has been received.

Admissions Portal

The Admissions Portal is a web-based portal which is available only to Admissions Officers through restricted access (non-published URL and User ID and Password) to manage, communicate and track applicants' progress throughout the application process. The Admissions Portal may be seamlessly integrated with the Applicant, Management and ELOR Portals. With a dynamic access, the admissions officers will only view their own applicants and not all the applicant pool. The following describes the features and flow process in this portal.

Unlike the Management Portal which is accessed by admissions staff at a center location, this portal is provided to various admissions officers at the school and college level. The Admissions Portal allows the admissions staff and officers to monitor the number of applications and various stages of their status. The admissions officers may select lists of applicants and flag them into certain category that is predefined by the association, council, group, or end user institution staff. As the batches/mailings of applicants are generated by the Management Portal, the admissions officers may be able to view these mailings and identify new and revised applicants. Admissions officers can track the progress of the application as the receipt of all the ELOR to the completion of the application. Using this portal, admissions officers can print the applications in PDF format along with the ELOR and the verified GPAs.

Any time a new batch/mailing of applicants is generated; the admissions officer may be provided with an electronic file to load into their local administrative system. Admissions officers can assign an admissions status (pre-defined for all participating members) to a candidate. This allows the schools to communicate any type of decision made for an individual applicant and allows the association to collect each status decisions for reporting and analysis. The Admissions Portal allows for schools and colleges to address their own status requirements, if different for pre-defined admissions status, through a section called local status. Individual schools and colleges can supplement the admissions status section of the portal by creating a local status and adding individual notes on candidates that can only be seen and used at the campus level.

The scanning process allows the admission officer/reviewer to view official documents with the completed application (electronic or paper). The process also gives the admissions officers confidence in the validity of the data and the verification, validation, and matching processed.

Management Portal

The Management Portal is a web-based portal which will be available only to selected Admissions Staff. It serves as the central management of the application through restricted access (non-published URL and User ID and Password) to manage, communicate and track applicants' progress throughout the application process. The Management Portal may be seamlessly integrated with the Applicant, Admissions, Advisors and ELOR Portals. The following describes some of the features and flow process in this portal.

The administrator may use this portal to interact daily with all members of the applicant pool and track their progress in real time. At any time during the progression of the application, the administrator may communicate with, or respond to the applicant and/or inquire about the progress of completing the application. The Management Portal is able automatically adjust the status of the application based on certain predefined business rules. The applicant will transition from In-progress to Submitted, to Complete, to Verified, to Mailed/Downloaded. Once the applicant is Complete (Transcripts Received and Payment Received), the applicant will appear in a Verification Queue ready for transcript(s) verification, should this be required by the association, council, group, or end user institution member schools and colleges.

The portal provides the Admissions staff the ability to verify the applicant's courses and grades by comparing the self reported coursework with the official transcripts. In the event that the course hours, grade or converted grade are misreported, the system allows the verifier to enter the correct information in separate columns without overwriting the original data as reported by the applicant. Both the original and the corrected information will be part of the applicant record. For increased quality control, the system stores the name of the verifier and the date when each transcript has been verified.

The portal allows the import of the official test scores based on the availability and type of official test scores directly from association, council, group, or end user institution FTP Portal. The official test scores would be automatically matched to applicants in the database using a common identifier (SIN). Official test scores do not overwrite the self reported scores.

The portal facilitates the process of Academic Update. Applicants enrolled in the fall or winter semester of the application cycle may arrange for their institution to send updated transcripts after the completion of the fall term. Applicants are given a window of time to submit their new grades on-line. Association, council, group, or end user institution may verify the updated coursework upon receiving the new transcripts. Updated applications will be available electronically and may be included in batch/mailings (i.e. including "revised" and "new" applications) in the order they become complete.

Upon the completion of verification, the portal calculates the requested GPA based on predefined association, council, group, or end user institution formulas. The GPAs are generated in real time and become part of the application (online and PDF printouts). This portal allows the administrator to communicate with the applicants via preset email templates by association, council, group, or end user institution. All emails are saved in a history log. The log can be public and private. The private log of correspondence can only be viewed by the admissions officers through the Admissions Portal.

As the applicants become complete and verified (if necessary inclusive of ELOR's), a periodic batch/mailing may be generated of new and revised applicants to be ready for the Admissions officers to view and/or download. The portal provides the administrator with the ability to create user accounts and approval access rights for Admissions Officers and Advisors. The scanning process enables the scanning team administer the process and ensure the document processors, CSR's and reviewers have the correct document.

Advisors Portal

The Advisors Portal is a web-based portal which will be available only to Advisors that are associated with the feeder schools that the applicants has indicated under Colleges Attended section of the application. The Advisors Portal may be seamlessly integrated with the Applicant, Management, and ELOR portals. The following describes some of the features and flow process in this portal.

The advisors will need to be authorized by the Administrator to enable them to logon to the portal. After receiving an automatic notification of their account information, advisors may logon to the portal using assigned usernames and passwords, in order to access up-to-date academic profile of applicants and their application status at the designated schools. Each advisor may only view eSubmitted applicant information from his/her respective school, on the condition that the applicant has given explicit permission to the advisor to access such information. In addition, association, council, group, or end user institution may determine the extent of information that the advisors may access.

This portal may provide all types of documentation or information to be shared with advisors including electronic/scanned files of official or unofficial documentation for review by the advisor.

Electronic Letters of Recommendation (ELOR) Portal

The Electronic Letter of Recommendations (ELOR) Portal may be seamlessly integrated with the Applicant, Admissions and Management Portals. The following describes some of the features and flow process in this portal.

The applicant may access the LOR section of the application to enter the list of the LOR requests. The maximum number of LOR requests will be decided by association, council, group, or end user institution. Upon the completion of an electronic request, an email from the association, council, group, or end user institution application may be sent to the reference that an applicant has requested his/her evaluation. The author may be provided with a user name, password and a link to the ELOR Portal.

Throughout the process, applicants may be able to delete, and add an LOR request to facilitate the completion their application. However, a request cannot be deleted if the corresponding evaluation has been marked as Received for eSubmitted applicants due to data and process integrity. Applicants may be advised to visit the Applicant Portal to check on the receipt status and the processing of their LOR.

The ELOR Portal is flexible as it accommodates references from a variety of professions, e.g. practitioners, researchers, alumni, political/legislative, former employers/supervisors, etc.

The first instance a reference accesses the site; he/she may be prompted to complete/update his/her profile that consists of partial information supplied by the applicant. The reference will revalidate and complete the missing information. The association, council, group, or end user institution may suggest some additional data elements that they wish to collect from the reference.

The reference may be presented with a list of her/his applicants' names that have requested electronic evaluations. The reference may opt to deny a request due to the applicant's election not to waive the right to view the evaluation, or when the reference has little or no knowledge of the applicant and/or her/his abilities. Therefore, the reference can decide at this point to select an applicant and complete the evaluation or decide to deny the request.

Should the reference deny an applicant's request, the ELOR Portal may send an email to the applicant alerting him/her of the fact. This may allow the applicant to re-visit the LOR section of the association, council, group, or end user institution application to delete the reference's request and add another request with different reference. Such a process may facilitate the receipt of the evaluations on time and may eliminate the need for the applicant to wait indefinitely for an evaluation due to a delay on the reference's side.

Once the reference selects an applicant from the list and starts the process of completing the LOR request, he/she may be presented with an Optional Upload section. The author may use the Upload section to attach an already prepared evaluation. The uploaded file may be either a .PDF or .DOC file.

Once the evaluation is complete, the reference may have a chance to preview the evaluation before final submission. Once submitted the evaluation can no longer be modified. This ensures that the schools will download a final version of the evaluation. The reference may be alerted to the fact that the evaluation cannot be edited after submission.

The scanning process is similar to the transcript scanning process where the cover letter will be given a unique identifier for scanning to indicate the individual applicant as well at identify the reference letter as a reference letter to be stored in the order and with the individual given the reference.

Equivalents

Those skilled in the art will recognize, or be able to ascertain using no more than routine experimentation, many equivalents to the specific embodiments of the invention described herein. While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations. Such equivalents are intended to be encompassed by the following claims.

I claim:

1. A method for centralizing a school application process, comprising the acts of:
   (a) receiving at least one school application supporting document associated with a second document including a unique identifier correlating the at least one school application supporting document with a school, applicant;
   (b) storing the at least one school application supporting document with an applicant file based on the unique identifier;
   (c) receiving school application information in a centralized application form and format from the school applicant via a web-based portal;
   (d) verifying the received school application information against information contained in the at least one school application supporting document by comparing the school application information and the at least one school application supporting document, and
   (e) consolidating information contained in the at least one school application supporting document and the received school application information into the applicant file.

2. The method of claim 1, further comprising (f) archiving the at least one school application supporting document based on the unique identifier.

3. The method of claim 1, further comprising (f) sending the applicant file to a recipient.

4. The method of claim 1, wherein the unique identifier comprises a bar code encoding at least one of: document identity, school applicant identity, application service, and application year.

5. The method of claim 1, further comprising (f) printing and auto-collating the verified school application information and the at least one school application supporting document.

6. The method of claim 3, further comprising (g) displaying the at least one school application supporting document, and the verified school application information to the recipient.

7. A method for centralizing an application process, comprising the acts of:
   (a) receiving at least one official transcript associated with a transcript request comprising a unique identifier correlating the at least one official transcript with an applicant;
   (b) receiving at least one letter of recommendation associated with a letter of recommendation request comprising a unique identifier correlating the at least one letter of recommendation with an applicant;
   (c) scanning the at least one official transcript and letter of recommendation into an applicant file based on the unique identifiers;
   (d) receiving coursework information from the applicant;
   (e) verifying the received coursework information against the at least one scanned official transcript by viewing the coursework information and scanned official transcript simultaneously; and
   (f) consolidating the at least one official transcript, letter of recommendation and verified coursework information correlated with an applicant into a centralized application.

8. The method of claim 7, further comprising (c)' archiving the at least one official transcript and letter of recommendation based on their unique identifiers.

9. The method of claim 7, further comprising (g) sending the centralized application to a recipient.

10. The method of claim 7, wherein the unique identifier comprises a bar code.

11. The method of claim 10, wherein the bar code comprises at least one of: document identity, applicant identity, application service, and application year.

12. The method of claim 7, wherein in act (e) further comprises: verifying the received coursework information against information contained in at least one scanned official transcript by viewing the coursework information and scanned official transcript simultaneously on two separate displays.

13. The method of claim 12, wherein the displays are monitors.

14. The method of claim 7, further comprising (g) printing and auto-collating the centralized application.

15. The method of claim 14, further comprising (g) printing and auto-collating the centralized application in both paper and electronic formats.

16. The method of claim 9, further comprising (h) displaying at least one scanned application supporting document, and the verified application information to the recipient(s).

17. A method for implementing a web-based centralized school application process, comprising the acts of:
(a) receiving school applicant information in a centralized application form and format via a web-based portal;
(b) receiving at least one paper or electronic application document associated with a school applicant via a unique identifier;
(c) verifying the school applicant information against information contained in the at least one paper or electronic application document;
(d) receiving information relating to the accuracy of the school applicant information;
(e) consolidating the school applicant information and the at least one paper or electronic application document into an application file; and
(f) transmitting the application file.

18. The method of claim 1, further including scanning the at least one school application supporting document into the applicant file.

19. The method of claim 17, wherein the at least one paper or electronic application document includes at least one of an official transcript and a letter of recommendation.

20. The method of claim 1, wherein act (d) further comprises: verifying the received school application information against information contained in the at least one school application supporting document by viewing the school application information and the at least one school application supporting document simultaneously.

* * * * *